United States Patent [19]

Harrigan

[11] Patent Number: 5,111,343
[45] Date of Patent: May 5, 1992

[54] GRADIENT FILTER

[75] Inventor: Michael E. Harrigan, Webster, N.Y.

[73] Assignee: Eastman Kodak Company, Rochester, N.Y.

[21] Appl. No.: 529,835

[22] Filed: May 29, 1990

[51] Int. Cl.⁵ .............................. G02B 5/20; G02B 5/22
[52] U.S. Cl. ........................................ 359/888; 359/885
[58] Field of Search .................. 350/311, 314, 317, 3.8, 350/6.8

[56] References Cited

U.S. PATENT DOCUMENTS

| | | | |
|---|---|---|---|
| 3,465,347 | 9/1969 | Hudson | 350/314 |
| 3,914,016 | 10/1975 | Dreyer | 350/314 |
| 3,935,545 | 1/1976 | Campillo et al. | 331/94.5 C |
| 4,013,338 | 3/1977 | Sato et al. | 350/314 |
| 4,093,460 | 6/1978 | Weinstein | 96/27 E |
| 4,298,275 | 11/1981 | Critchlow et al. | 355/71 |
| 4,469,407 | 9/1984 | Cowan et al. | 350/314 |
| 4,594,507 | 6/1986 | Elliott et al. | 250/331 |
| 4,605,606 | 8/1986 | Ferrante | 350/3.8 |
| 4,722,581 | 2/1988 | Hamada et al. | 350/6.8 |
| 4,832,469 | 5/1989 | Noguchi et al. | 350/404 |
| 4,933,688 | 6/1990 | Brophy | 346/108 |

Primary Examiner—Ian J. Lobo
Attorney, Agent, or Firm—Donald D. Schaper

[57] ABSTRACT

A gradient filter is disclosed which is adapted to compensate for the variation of beam divergence of diode lasers. The gradient filter comprises a substrate having a transmission density distribution along at least one axis which is inversely proportional to a Gaussian intensity distribution along the axis. Such a gradient filter has a transmission profile which is transparent, or nearly so, at the center of the beam and which falls gradually to zero transmission in an area spaced from the center.

5 Claims, 2 Drawing Sheets

GRADIENT FILTER

FIELD OF THE INVENTION

This invention relates to a gradient filter, and more particularly, to such a filter which is adapted to reduce the variations in the width of a beam from a diode laser.

BACKGROUND OF THE INVENTION

In digital printers which create images from spots of light (pixels), it is important to have stable and reproducible spots. Variations in the pixel size can create many undesirable image artifacts. In certain types of printers, gas lasers are used as the light source. Gas lasers produce very predictable beam sizes, and the pixel size is almost independent of the laser source itself.

In recent years, there have been attempts to use diode lasers instead of gas lasers in laser printers. The use of diode lasers reduces the cost of the printer and permits a drastic reduction in the size and complexity of the printer. Diode lasers can be modulated directly at frequencies as high as several hundred Mhz by simply modulating the drive current, and thus, no external modulators are required. One problem, however, in using diode lasers in printer applications is the variation in beam divergence from laser to laser. This variation in the beam divergence causes a variation in the final pixel size which is approximately proportional to the divergence variation. In some types of diode lasers, the beam divergence can vary by as much as a factor of two. Thus, in order to replace gas lasers with diode lasers in laser printers, some method is generally needed to overcome the beam divergence variation of the diode lasers.

Variations in beam divergence from laser to laser can be overcome with zoom optical systems which can be adjusted according to the divergence of a particular laser. This technique will produce a fixed beam size exiting the optical system, but it has the disadvantage of introducing more components into the system. These components can be complex since diode lasers generally have elliptical light output profiles, and consequently, the optical system may need to compensate independently for each perpendicular section of the beam.

Another technique which has been used in some applications to solve the beam variation problem is to place an elliptical aperture in the beam at some convenient location. An aperture of this type is shown, for example, in U.S. Pat. No. 4,832,469. A disadvantage of these apertures is that they introduce side lobes of intensity in the beam. The light beam exiting the aperture also takes on a non-Gaussian distribution, and this makes it more difficult to compute the final spot size. Another disadvantage is that, if close control of the beam size is required, several apertures sized in small steps will be needed to cover the range of divergences found in diode lasers.

It is known in the art to use so-called apodizing filters formed on a photographic medium to control various aspects of a light beam as shown, for example, in U.S. Pat. No. 4,594,507, and U.S. Pat. No. 4,469,407. However, neither of these patents is directed to solving the problem of variation in the divergence of a beam from a diode laser.

SUMMARY OF THE INVENTION

It is an object of the present invention to overcome the problems discussed in the prior art and to provide an improved gradient filter for use in controlling the beam divergence in diode lasers.

In accordance with one aspect of the present invention, there is provided a gradient filter comprising a substrate having a transmission density distribution along one axis which is inversely proportional to a Gaussin intensity distribution along the axis.

In one embodiment of the present invention, a gradient filter is provided having a transmission profile which is transparent, or nearly so, at the center of the beam and which falls gradually to zero transmission in an appropriate Gaussian profile. In all applications, except those requiring the most stringent beam size control, only one aperture size is needed. The filter profile can, in general, follow an elliptical Gaussian function as described hereinafter. The gradient filter can be made on photographic film or other suitable substrate.

A principal advantage of the present invention is that it overcomes the problem of beam divergence variations in diode lasers without the use of complex optics. The beam from the gradient filter disclosed herein has a substantially Gaussian profile without significant side lobes, and a single filter having one size of aperture can control the beam divergence variations over a relatively wide range of emission angles.

A further advantage of using the gradient filter of the present invention to control the beam size is that a higher degree of control can be achieved than is practical with a hard aperture. This is because the amount of truncation which one can use with a hard aperture is limited by the degree to which one can introduce the side lobes. Smaller truncation of the beam produces smaller side lobes, but provides less control over the beam size. With the gradient filter, the amount of truncation can be adjusted at will. The limit is determined by the amount of light which can be lost in a particular system.

Other features and advantages will become apparent upon reference to the following description of the preferred embodiment when read in light of the attached drawings.

DETAILED DESCRIPTION OF THE INVENTION

Figure 1:
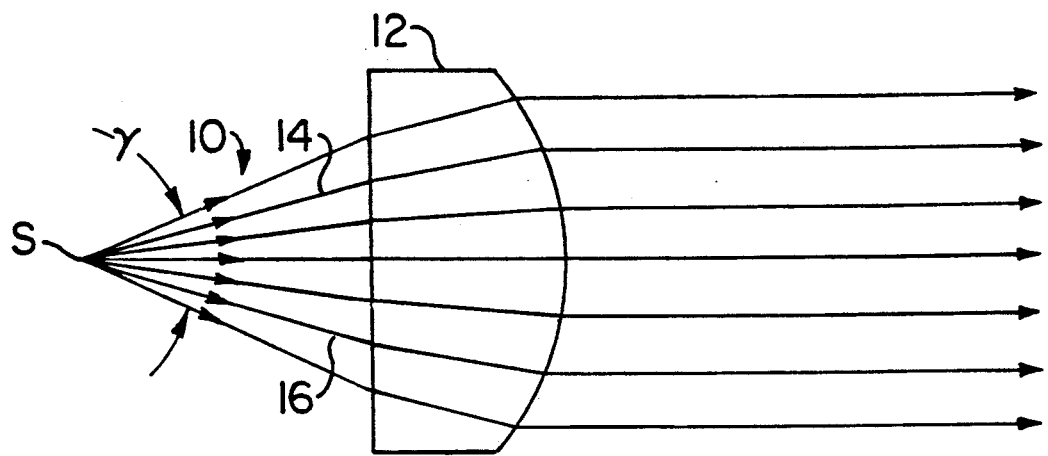
FIG. 1 is a schematic drawing illustrating how the beam size exiting a collimating lens can change size depending on the light spread coming from a diode laser.

With reference to FIG. 1, there is shown a beam 10 of the shape emitted from a diode laser (not shown) at a point S. Beam 10 is focussed into a collimated beam by means of a lens 12. It is readily apparent that if the angle of emission $\gamma$ of the beam 10 is reduced, so that, for example, the two light rays 14 and 16 are the limiting rays, then the size of the collimated beam is reduced accordingly. This is a problem in the use of diode lasers which have emission angles which are not the same from device to device. Further, in some cases, the emission angle of a diode laser changes when the light ouput changes. A change in beam size causes the final focussed spot in apparatus such as a printer to change size. Changes in the size of the focussed spot, or pixel, can cause a variety of undesirable effects, depending on how large these changes are.

Figure 2:
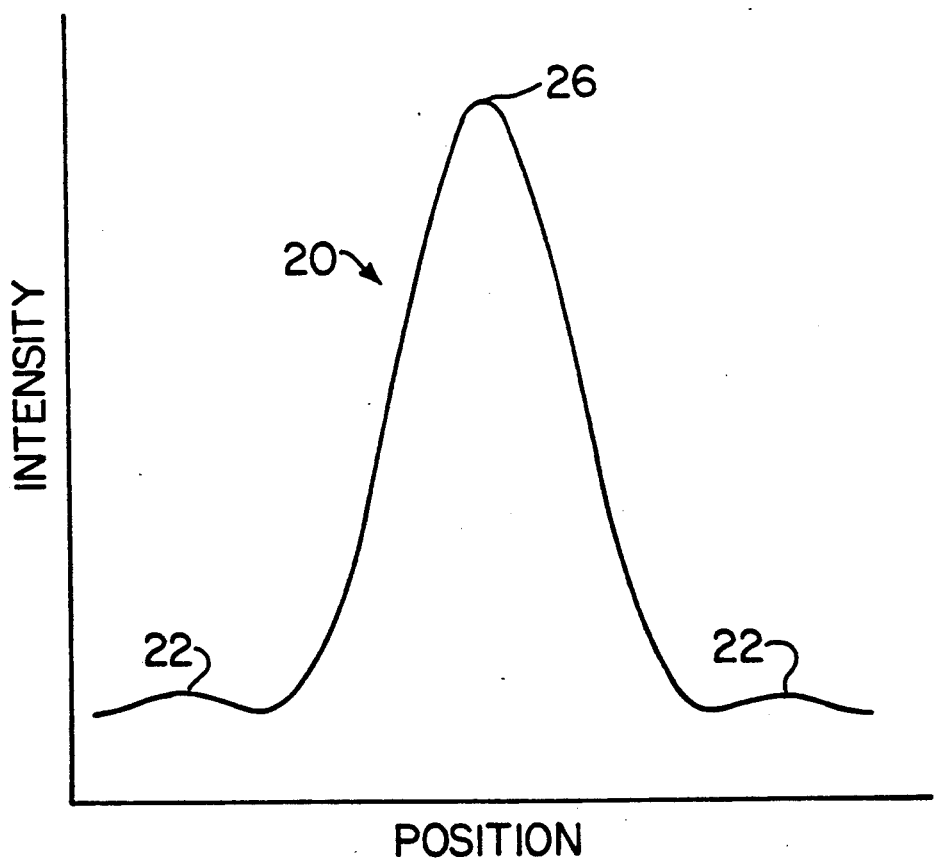
FIG. 2 is a graph showing the profile of a beam from a diode laser which has passed through a circular aperture.

One known means of reducing beam size variation is to place an aperture (not shown) in the path of the beam. This aperture should be small enough so that the beam profile on the exit side of the aperture is largely dependent on the aperture size. In order to achieve control of the beam with this technique, it is necessary to "truncate" the beam, that is, have the aperture extend well into the beam so that the $e^{-2}$ beam radius is comparable to the radius of the aperture. When this is the case, undesirable side lobes of intensity are introduced into the beam profile. With reference to FIG. 2, there is shown a typical beam profile 20 for the case of a uniformly illuminated circular aperture. It will be seen that side lobes 22 are formed at opposite sides of the beam. The side lobes 22 are about 2% of the peak intensity, shown at 26, and they can lead to undesirable image artifacts.

In the present invention, a gradient filter is used, instead of the aperture described above, to reduce beam size variations. The transmission of the filter can vary as:

$$e^{-2(r/w_f)^2} \quad (1)$$

Figure 3:
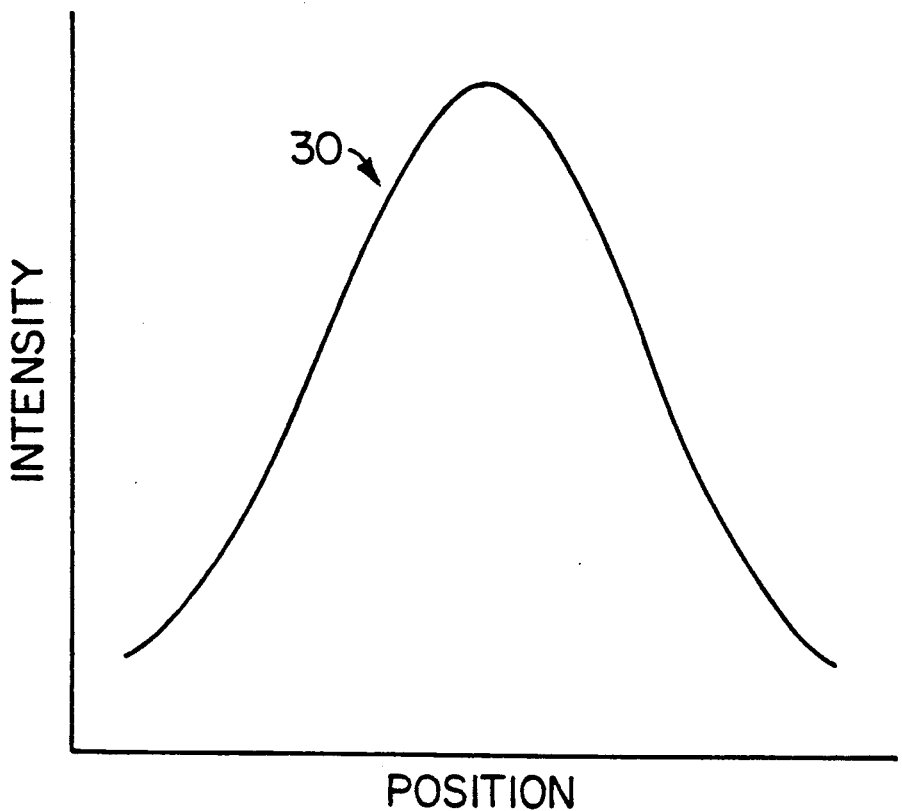
FIG. 3 is a graph showing the desired Gaussian transmission profile of the filter of the present invention.

A transmission profile 30 of the filter of the present invention is shown in FIG. 3. If this filter is placed in the path of the Gaussian beam with intensity distribution given by:

$$I_0 e^{-2(r/w)^2} \quad (2)$$

then the exiting beam will have an intensity distribution given by:

$$I_0 e^{-2(r/w_o)^2} \quad (3)$$

where $$\frac{1}{w_o^2} = \frac{1}{w^2} + \frac{1}{w_f^2} \quad (4)$$

In the above formulae (1)–(4), r is the distance from the center of the beam to the point of interest, $w_f$ is the $e^{-2}$ transmission radius of the filter, w is the $e^{-2}$ intensity radius of the beam entering the filter, $w_o$ is the $e^{-2}$ intensity radius of the beam exiting the filter, and $I_o$ is the beam intensity.

It can be shown that the total power out of the filter, $P_o$, is related to the input power, $P_I$, by:

$$P_o = P_I (w_o/w)^2 \quad (5)$$

If δw represents a small change in the $e^{-2}$ radius of the beam entering the filter and $δw_o$ represents the resulting change in the $e^{-2}$ radius of the beam exiting the filter, it can be shown that:

$$\frac{\delta w_o}{w_o} = \frac{P_o}{P_I} \cdot \frac{\delta w}{w} \quad (6)$$

From Eqn. 6, it can be seen that the fractional size change in the exiting beam divided by the fractional size change in the entering beam is reduced by the fractional power lost by the absorbing filter.

If, for example, it is desired to have the exiting beam fractional change be half that of the entering beam, then $P_o$ must be equal to half of $P_I$. From Eqn. 5, then, it will be necessary to have:

$$(w_o/w)^2 = 0.5$$

so the output beam will be about 70% of the width of the input beam. From Eqn. 4, it will be seen that the Gaussian filter will need to have $w_f = w$, or the same width as the nominal entering beam.

The above is a simplified explanation for rotationally symmetric beams. Most diode lasers have elliptically shaped beams of the form:

$$I_o e^{-2(x/w_x)^2 - 2(y/w_y)^2} \quad (7)$$

In this equation, x and y are position coordinates from the center of the beam. The x section of the beam has an $e^{-2}$ radius of $w_x$ and the y section of the beam has an $e^{-2}$ radius of $w_y$.

For an elliptically-shaped beam, a filter having an elliptical shape is necessary in which each axis of the ellipse is related to the size control desired and to the amount of power which can be discarded in the system. It is possible in this case to control the x and y sections of the beam to separate degrees of fractional change.

In one method of making the gradient filter of the present invention, a positive film is exposed with a Gaussian beam which has been sized according to the desired filter dimension. If an elliptical aperture is being made, anamorphic optics consisting of cylinders and prisms can be used to shape the exposing beam to the desired dimensions. The developed positive will have high transmission in the center and drop off in an approximate Gaussian profile (Eqn. 3) to the unexposed density level of the film.

Another method which can be used to make the filter is to expose a master negative film with a laser printer in which the light is modulated in accordance with a digital signal. Precise control down to the level of the pixel size can be had with this method. A negative thus exposed can be contact printed to another negative to produce a positive transmission profile of the type produced by the direct-exposure method described above.

A third technique which can be used to make the gradient filter of the present invention is to deposit absorbing material on a transparent substrate. This can be done, for example, by rotating the substrate and moving the source of the absorbing material radially across the substrate at a predetermined rate such that the amount of material deposited varies according to the desired transmission profile. The device produced in this manner can then be used as a master to contact print the filters. The master would most likely be a negative with high transmission occurring farther from the center of the filter. It is easier to deposit more material in the center of the substrate since it is rotating more slowly. This technique would naturally make a rotationally symmetric pattern which may not be appropriate for an elliptical beam; however, the master can be imaged anamorphically onto film to expose the filter. The optical system would be arranged to give the desired magnifications in each direction of the beam.

Figure 4:
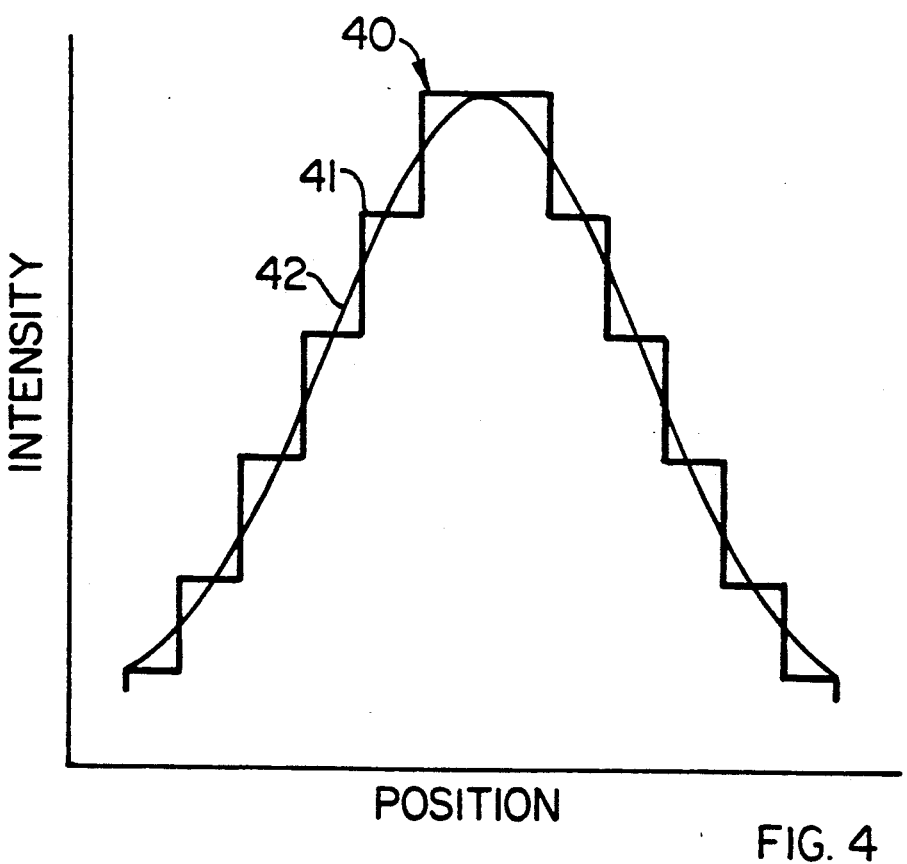
FIG. 4 is a graph showing a Gaussian transmission profile and an approximation thereof produced by a series of concentric ring filters.

With reference to FIG. 4, there is shown a transmission profile 40 which can be produced by a gradient filter made in accordance with another embodiment of the present invention. The transmission profile 40 can be produced by a series of concentric ring filters (not shown). Each ring filter in the series has a constant transmission, and each of the filters has a transmission different from the other ring filters. The transmission of each ring filter is selected to produce a step 41 in the transmission profile 40 such that profile 40 follows the desired Gaussian profile indicated at 42. It will be apparent that a master could be assembled using the concentric ring filters and that the master could then be used to produce a gradient filter by the photographic and optical methods described above.

In the use of the gradient filter of the present invention, the placement of the filter in the beam can have an effect on the level of control. For example, if the filter is placed in a collimated space as shown in FIG. 1, the amount of control over beam size is limited by the fixed filter dimensions. If the filter is placed in the space between the laser and collimating lens, then the filter can be shifted along the optical axis depending on the divergence characteristics of the diode laser. In this respect, the gradient filter is similar to the hard aperture in its placement.

This invention has been described in detail with particular reference to the preferred embodiment thereof, but it will be understood that variations and modifications can be effected within the spirit and scope of the invention.

I claim:

1. A gradient filter for reducing width variations in a diode laser beam, said filter being formed on a photographic film and having a transmission profile proportional to:

$$e^{-2(x/w_x)^2 - 2(y/w_y)^2}$$

where x and y are position coordinates from a center of the beam, $w_x$ is the $e^{-2}$ radius of the x section of the beam, and $w_y$ is the $e^{-2}$ radius of the y section of the beam.

2. A gradient filter, as defined in claim 1, wherein said film is a negative film.

3. A gradient filter, as defined in claim 1, wherein said film is a positive film.

4. A gradient filter for reducing width variations in a diode laser beam, said filter being formed by a plurality of concentric elements which form a discrete approximation of a transmission profile proportional to:

$$e^{-2(x/w_x)^2 - 2(y/w_y)^2}$$

where x and y are position coordinates from a center of the beam, $w_x$ is the $e^{-2}$ radius of the x section of the beam, and $w_y$ is the $e^{-2}$ radius of the y section of the beam.

5. A gradient filter, as defined in claim 4, wherein each of said elements is elliptical in shape.

* * * * *